(12) United States Patent
Gannon et al.

(10) Patent No.: US 7,705,288 B2
(45) Date of Patent: Apr. 27, 2010

(54) OPTICAL READING DEVICE WITH LIGHT BLOCKING GASKET

(75) Inventors: Colleen Patricia Gannon, Jordan, NY (US); Vivian Loomis Hunter, Baldwinsville, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 92 days.

(21) Appl. No.: 11/395,778

(22) Filed: Mar. 31, 2006

(65) Prior Publication Data

US 2007/0228306 A1  Oct. 4, 2007

(51) Int. Cl.
G01D 5/34 (2006.01)
H01J 1/56 (2006.01)

(52) U.S. Cl. ............. 250/229; 235/462.35; 235/462.42; 235/462.43

(58) Field of Classification Search ................. 250/229, 250/214 AL; 235/462.35, 462.42, 462.43
See application file for complete search history.

(56) References Cited

U.S. PATENT DOCUMENTS

| 6,105,869 | A  | * | 8/2000 | Scharf et al. ................. 235/454 |
| 6,340,114 | B1 | * | 1/2002 | Correa et al. ........... 235/462.22 |
| 2003/0089776 | A1 | * | 5/2003 | Hennick et al. ............. 235/454 |
| 2003/0136844 | A1 | * | 7/2003 | Dvorkis ................. 235/472.01 |
| 2004/0050188 | A1 | * | 3/2004 | Richards et al. ............ 73/866.3 |

* cited by examiner

*Primary Examiner*—Thanh X Luu
*Assistant Examiner*—Francis M Legasse, Jr.
(74) *Attorney, Agent, or Firm*—Hiscock & Barclay, LLP

(57) ABSTRACT

An optical reading device comprising a sensor array having pixels which are exposed to an image; an illumination generator for illuminating the image with light, the illumination generator being configured to have a front face; a housing for housing the sensor array, aiming pattern generator and illumination generator for hand held operation, the housing having a window disposed between the illumination generator and the image for permitting transmission of the illuminating light; a lens for focusing light to the sensor array, wherein the lens protrudes through the illumination generator; a gasket disposed around the lens for blocking light reflected off of the window from reaching the sensor array.

19 Claims, 6 Drawing Sheets

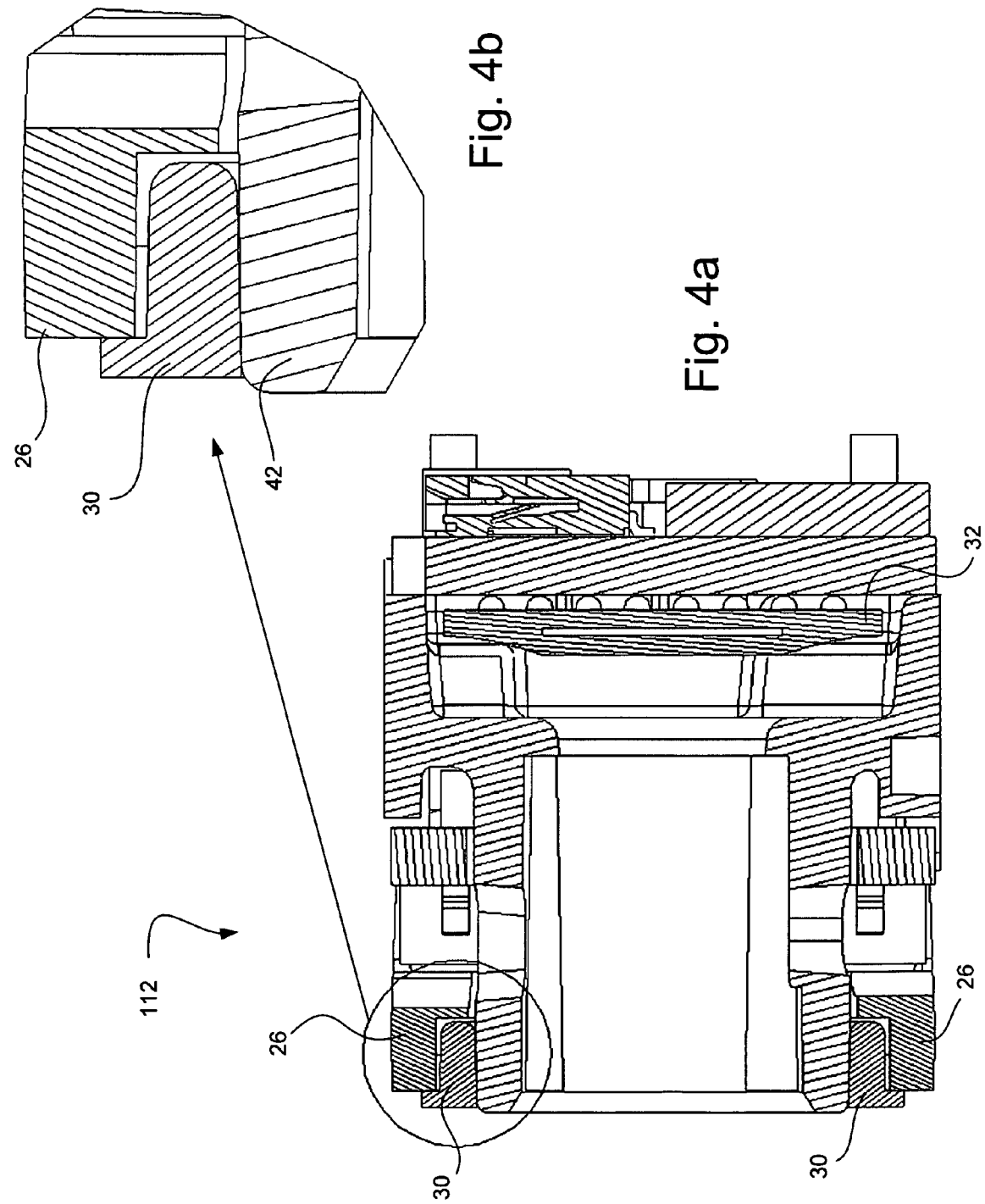

Fig. 6
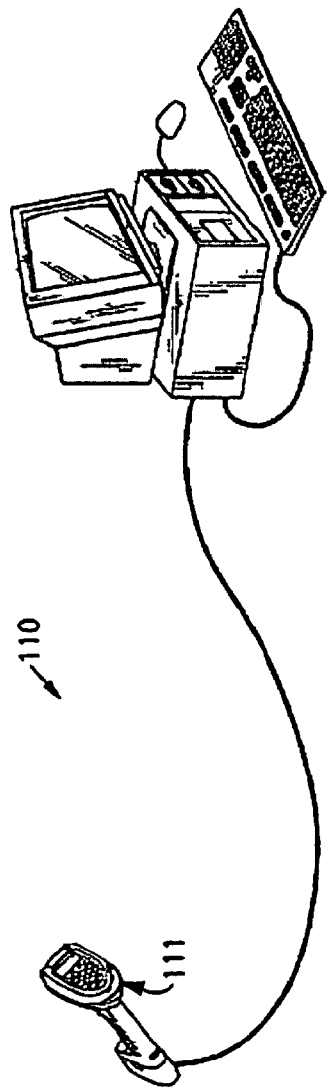
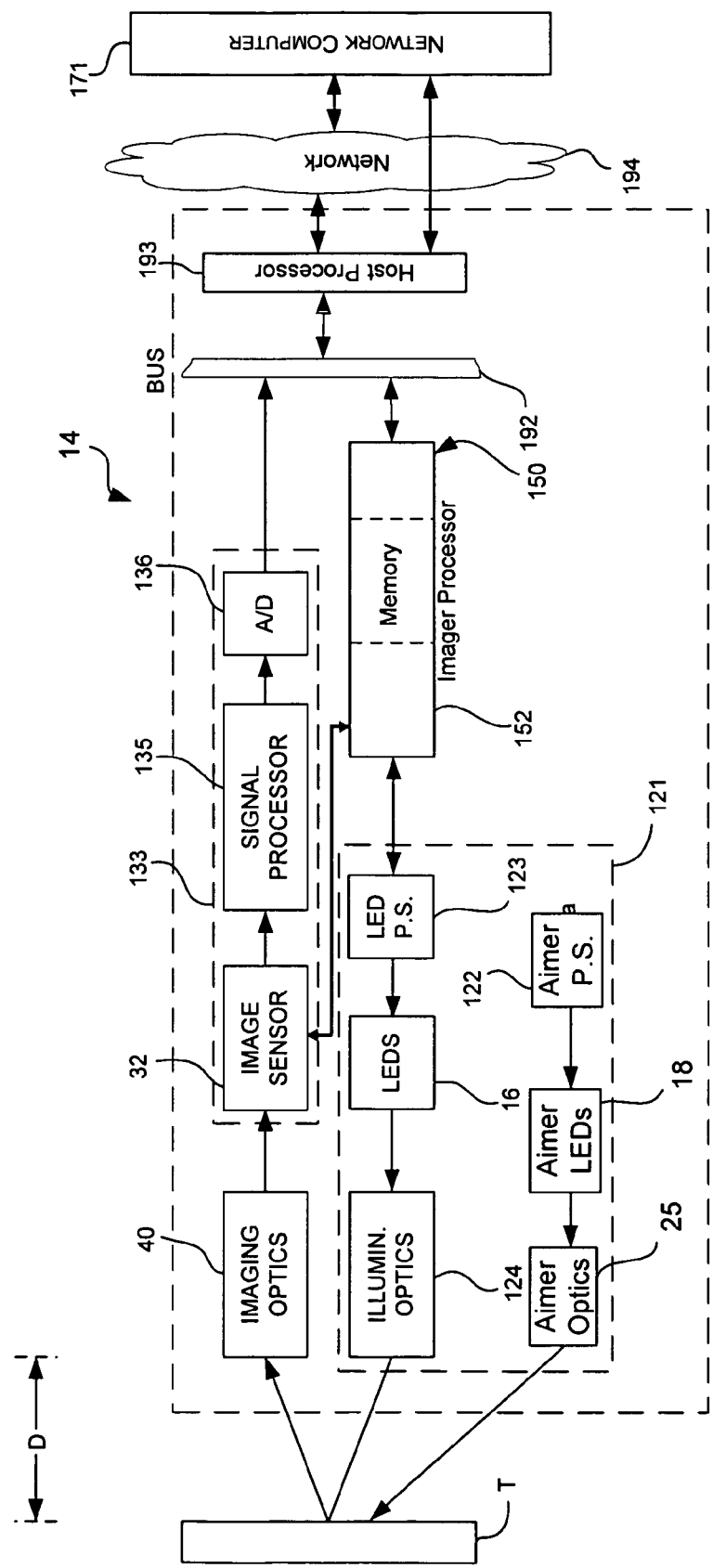

ary cross-sectional view of an optical or indicia reader 111
OPTICAL READING DEVICE WITH LIGHT BLOCKING GASKET

FIELD OF THE INVENTION

The present invention relates to optical reading or other imaging devices, and more particularly to an optical reading device having a light blocking gasket.

BACKGROUND

There are many types of imaging devices that are used to provide a record of captured images. Data may sometimes be extracted from the captured images. Exemplary data may be text from documents, measurable parameters in the image, etc.

Optical reading devices may be one type of imaging device, and typically read data represented by symbols. For instance a bar code symbol is an array of rectangular bars and spaces that are arranged in a specific way to represent elements of data in machine readable form. Optical reading devices typically transmit light onto a symbol and receive light reflected off of the symbol. The received light is interpreted by an image processor to extract the data represented by the symbol.

One-dimensional (1D) optical bar code readers are characterized by reading data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively high resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation and reference structures. When scanning 2D matrix codes, the horizontal and vertical relationships of data elements are recorded with about equal resolution.

Often times a bar code reader may be portable and wireless in nature thereby providing added flexibility. In these circumstances, such portable bar code readers form part of a wireless network in which data collected within the terminals is communicated to a host computer situated on a hardwired backbone via a wireless link. For example, the portable bar code readers may include a radio or optical transceiver for communicating with a host computer via a base station.

Efforts regarding such systems have led to continuing developments to improve their versatility, practicality and efficiency.

BRIEF DESCRIPTION OF THE DRAWINGS

FIGS. 4*a* and 4*b* are cross sectional side views of an imaging module in accordance with the invention.

FIG. 6 is a block schematic diagram of an imaging module in accordance with the invention.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art. Wherever possible, the same reference numbers will be used throughout the drawings to refer to the same or like parts.

An optical reader in accordance with the invention may be adapted for reading symbol indicia for numerous functions. A detailed description of transaction terminals and their operation is disclosed in commonly owned published U.S. Patent Application Publication No. 30029917 entitled OPTICAL READER FOR IMAGING MODULE, which is hereby incorporated herein in it's entirety.

The description of the optical reader in said publication is broken down into the eight subheadings: General Imaging Module Architectures and Assembly; Illumination Systems; Aiming Systems, Illumination Device Architectures; Illumination/Aiming Color Emission Control and Coordination; Receive Optics, Packaging of Electronics; and Applications, Operating Environment, and Control Circuit Functionality.

Figure 1:
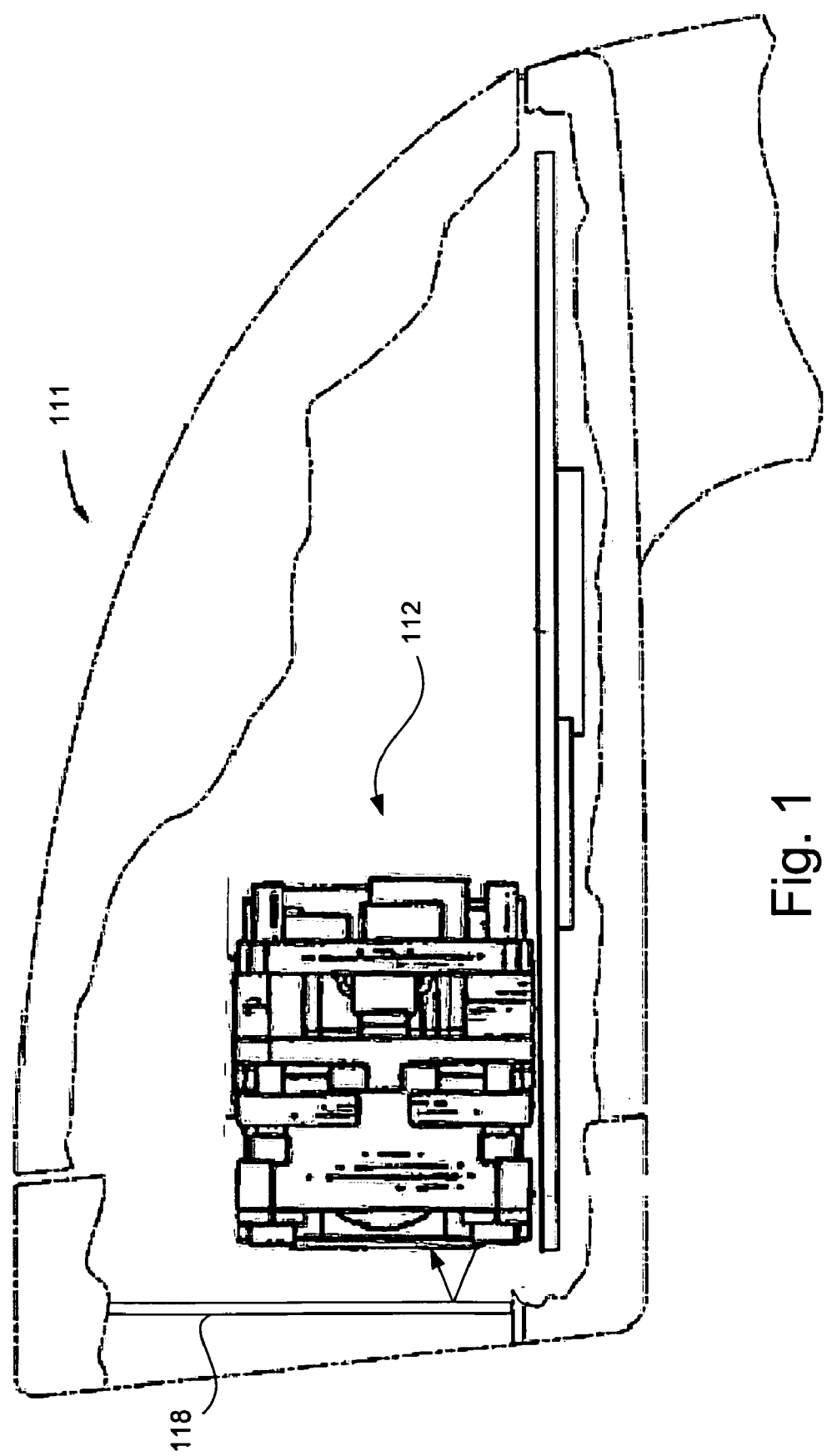
FIG. 1 is a fragmentary partially cutaway side view of a reader having an imaging module in accordance with the invention.

Referring to FIG. 1, there is shown an enlarged fragmentary cross-sectional view of an optical or indicia reader 111 constructed in accordance the invention. Reader 111 includes an imaging assembly 112 packaged in a housing. The indicia reader 111 has a protective transparent window 118.

Figure 2A:
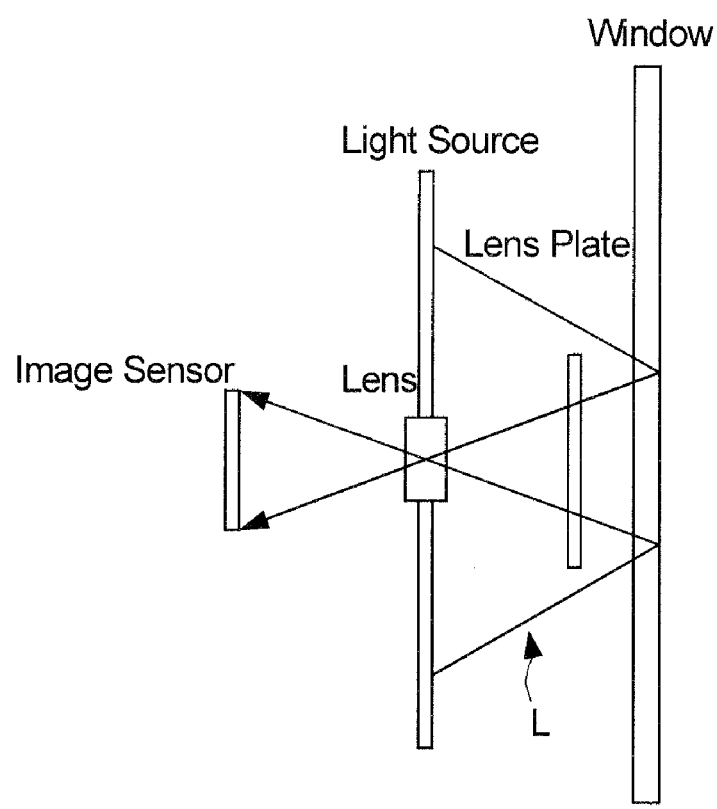
FIG. 2*a* is a schematic diagram of an optical reading system in accordance with the prior art.

Referring to FIG. 2*a*, an optical reader includes a light source or plate for illuminating a target. The light source is located a distance away from lens, which focuses light being received from the target on an image sensor. The lens and light source are located behind a lens plate and window. A problem is that a certain amount of light (L) from the light source reflects off of the window and passes through the lens and is therefore "seen" by the image sensor. In addition, light falls onto the lens plate and the image sensor will "see itself", because the lens plate is very bright with illumination from the light source, thereby causing reflections in the image.

Figure 2B:
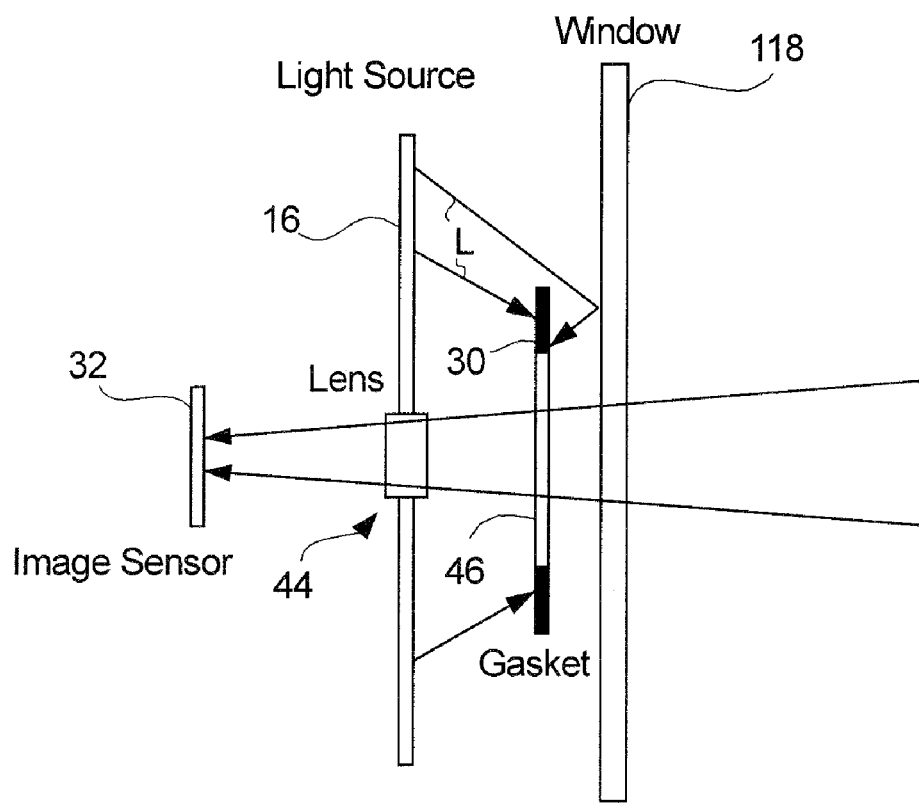
FIG. 2*b* is a schematic diagram of an optical reading system in accordance with the present invention.

Referring to FIG. 2*b*, an exemplary optical reader according to the present invention includes a light source 16 for illuminating a target. The light source is located a distance away from a lens 44, which focuses light being received from the target on an image sensor 32. The lens and light source are located behind a lens plate 46 and window 118. A certain amount of light (L) from the light source 16 that would have reflected off of the window 118 back to the sensor 32 is now blocked by a gasket 30.

Figure 3:
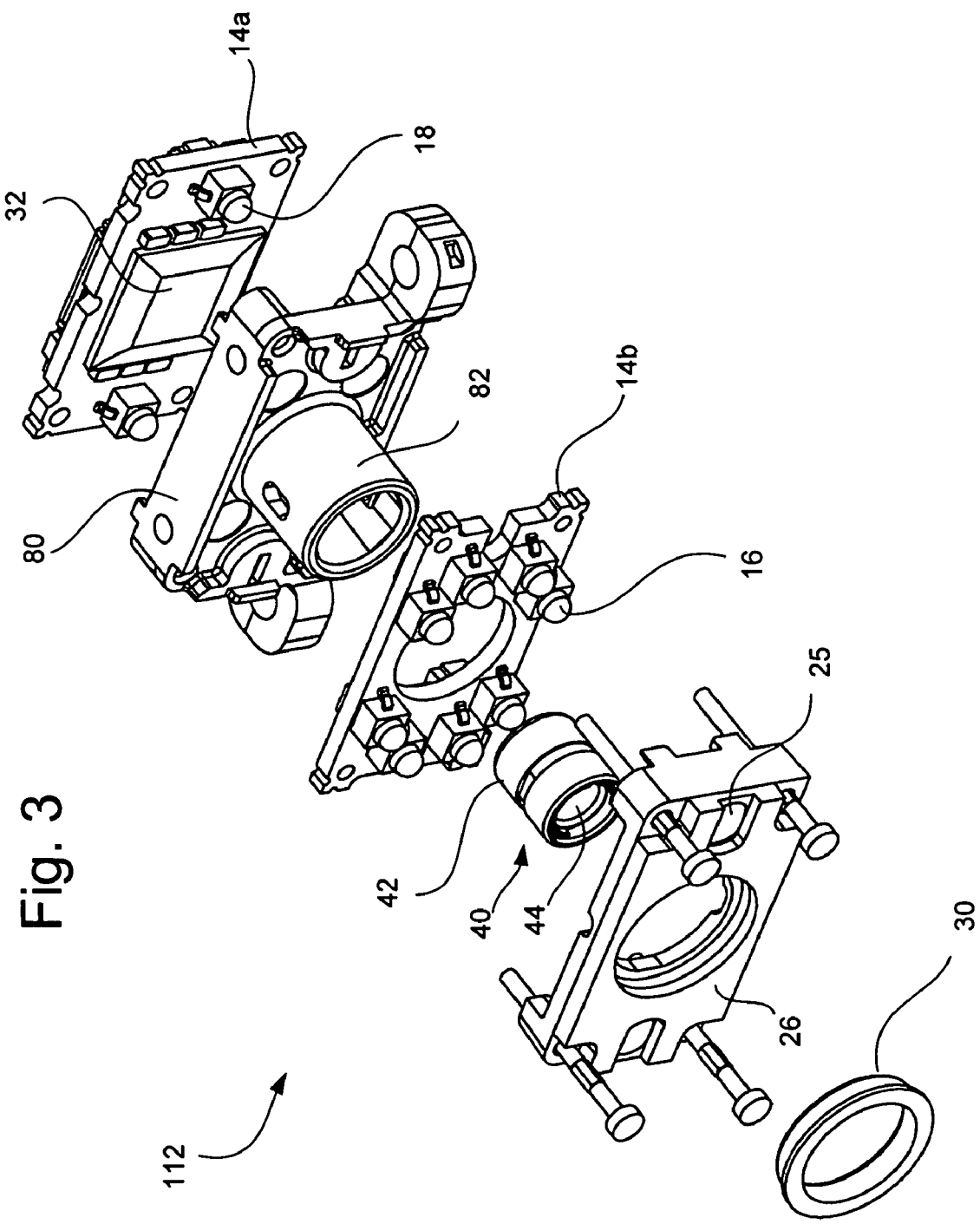
FIG. 3 is a perspective assembly view of an imaging module in accordance with the invention.

Referring to FIG. 3, an embodiment of imaging module 112 (or image engine) in accordance with the invention is shown in FIGS. 2-3. Imaging module 112 includes a first board 14a carrying such things as an image sensor 32 typically provided by an image sensor chip and aiming light sources 18, an imager processor, memory, etc. and a second circuit board 14b for carrying such things as illumination light sources 16. The first and second circuit boards 14a and 14b are supported by a support assembly 80.

Support assembly 80 includes a containment section for containing image sensor 32 and an integrated retainer section 82 for retaining a lens or optics assembly 40 having a lens 44 retained by a lens housing 42. Imaging module 112 further includes an optical plate 26 which serves as a light pipe to carry various emitted light for aiding in the development of a substantially uniform illumination pattern over a target area corresponding to a field of view of image sensor 32. An aiming optics 25 aid in the projection of an aiming pattern in a target area. A light sealing gasket 30 is provided to reduce light from reflecting from the optical plate 26 off window 118 back to the image sensor 32.

Referring to FIGS. 3, 4a, 4b, imaging module 112 includes optical plate 26 through which lens housing 42 protrudes. A gasket 30 is disposed around the housing 42 and between it and plate 26. Gasket 30 is composed of a flexible or compliant material, such as an elastomer and molded or formed to provide a seal between the plate and housing such that light does not pass therebetween. Referring to FIG. 1, some light transmitted by plate 26 will reflect off window 118 back into optics lens 44, thereby saturating or overexposing image sensor 32 or causing unwanted bright spots in the image. Gasket 30 minimizes this effect by reducing the amount of light transmission from the optical plate in the area around the lens and absorbing reflected light coming from the window.

Exemplary materials suitable for gasket 30 are thermoplastic elastomers such as Monprene® (Teknor Apex) or Santoprene™ (Advanced Elastomer Systems).

It is to be noted that gasket 30 may have shapes other than the circular one shown, such as square, rectangular, octagonal, etc. Considerations that determine the size of the light gasket are:

1) The system field angle
2) The height of the housing beyond the lens position
3) How far the window is positioned from the image sensor The system field angle is determined by the focal length of the lens and the image sensor size.

Figure 5A:
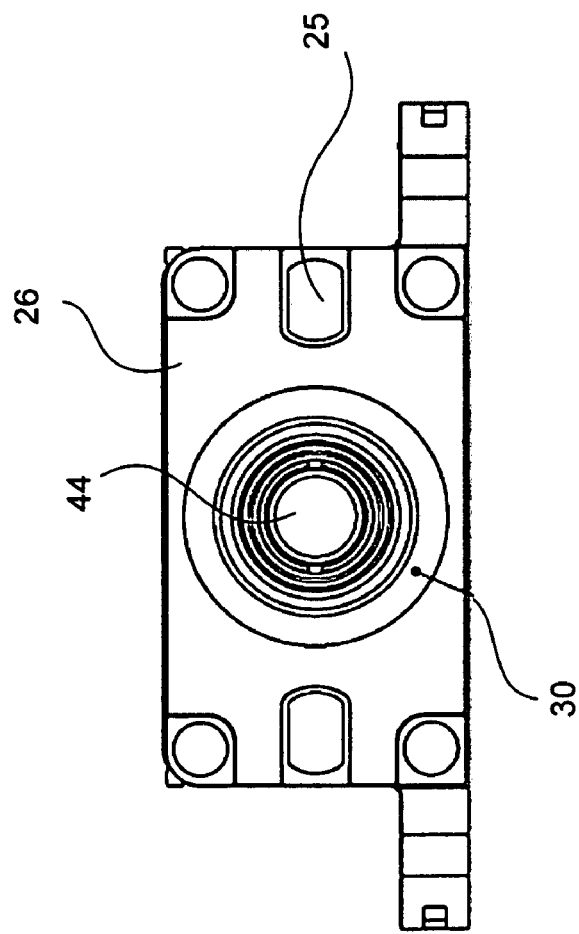
FIGS. 5*a* and 5*b* are front views of imaging modules in accordance with the present invention.

FIG. 5a provides a front view of an imaging module in accordance with the present invention, wherein the imaging module has an aimer optics components 25, a light source 26, a lens plate 44 and a generally circular light blocking gasket 30.

Figure 5B:
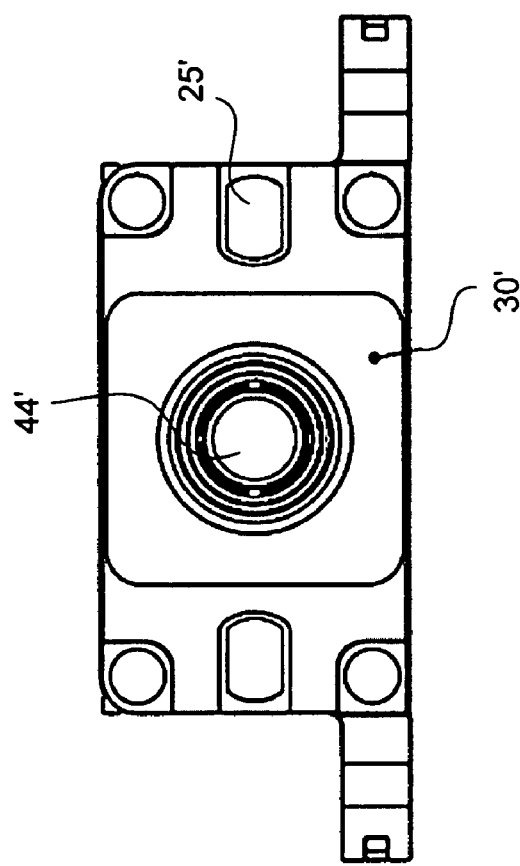

FIG. 5b provides a front view of an imaging module in accordance with the present invention, wherein the imaging module has an aimer optics components 25', a light source 26', a lens plate 44' and a generally square or rectangular light blocking gasket 30'.

Referring to the block diagram of FIG. 6, an imaging system 110 includes an imaging device processor assembly 14 which includes an illumination assembly 121 for illuminating a target area T, such as a substrate bearing a 1D or 2D bar code symbol or a text string, a document or portion of a document or other machine readable indicia, and an imaging assembly 133 for receiving an image of object T and generating an electrical output signal indicative of the data optically encoded therein. Illumination assembly 121 may, for example, include an illumination source assembly e.g. LED power supply 123, Aimer power supply 122, LEDs 16, 18, together with an illuminating optics assembly 124, such as one or more aimer optics components 25, (such as lenses, diffusers, wedges, reflectors, etc.) for directing light from light source 16, 18 in the direction of a target object T. Illumination assembly 121 may comprise, for example, laser or light emitting diodes 16, 18 (LEDs) such as white LEDs or red, infrared LEDs. Illumination assembly 121 may include target illumination optics for projecting an aiming pattern on a target T. Illumination assembly 121 may be eliminated or disabled if ambient light levels are certain to be high enough to allow high quality images of object T to be taken. Illumination assembly 121 may also be located remote from imaging device 111, at a location so as to eliminate or reduce specular reflections. Imaging assembly 133 may include an image sensor 32, such as a color or monochrome 1D or 2D CCD, CMOS, NMOS, PMOS, CID or CMD solid state image sensor, together with an imaging optics assembly 40 for receiving and focusing an image of object T onto image sensor 32. CMOS based image sensors contain arrays of light sensitive photodiodes (or pixels) that convert incident light energy into electric charge. CMOS based image sensors allow each pixel in a two-dimensional array to be directly addressed, so that sub-regions of a full frame of image data can be independently accessed.

Features and advantages associated with incorporating a color image sensor in an imaging device, and other control features which may be incorporated in a control circuit are discussed in greater detail in U.S. Pat. No. 32,725 entitled "An Optical Reader Having a Color Imager" incorporated herein by reference. The array-based imaging assembly may be replaced by a laser array based imaging assembly comprising one or more laser sources, a scanning mechanism, emit and receive optics, at least one photodetector and accompanying signal processing circuitry. It is to be noted that the image sensor 32 may read images without the illumination from illumination assembly 121, such as by ambient light.

Imaging device processor assembly 14 may include a programmable control circuit or imager processor 150. Imager processor 150 controls the amount of illumination provided by LEDs 16, 18 by controlling the output power provided by LED power supply 123. Imager processor 150 may also control other functions and devices of the image, such as a CY8C24223A made by Cypress Semiconductor Corporation, which is a Mixed-Signal Array with On-Chip Controller devices designed to replace multiple traditional MCU-based system components with one single-chip programmable device. The processor may include configurable blocks of analog and digital logic, as well as programmable interconnects. Processor 150 includes a predetermined amount of memory 152 for storing data.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. An optical reading device comprising:
   a sensor array having pixels which are exposed to an image of a target;
   an illumination generator for illuminating the image with light, the illumination generator being configured to have a front face;
   an aiming pattern generator for producing a visible aiming pattern on the target; a housing for housing the sensor array, aiming pattern generator and illumination generator for hand held operation,
   the housing having a window disposed between the illumination generator and the image for permitting transmission of the illuminating light which a lens assembly comprising a lens retained by a lens housing, the lens focusing light to the sensor array, wherein the lens assembly protrudes through the illumination generator; and
   a gasket disposed around at least part of the lens and an on the front face of the illumination generator, wherein the gasket is positioned to absorb illuminating light reflected off of the window traveling back towards the lens.

2. An optical reading device in accordance with claim 1, wherein the illumination generator is comprised of LEDs disposed behind a light pipe.

3. An optical reading device in accordance with claim 1, wherein the illumination generator comprises a flat face.

4. An optical reading device in accordance with claim 1, wherein illumination the generator comprises a flat semi-transparent face.

5. An optical reading device in accordance with claim 1, wherein the gasket is comprised of a thermoplastic elastomer.

6. An optical reading device in accordance with claim 1, wherein the gasket is flanged.

7. An optical reading device comprising:
   a sensor array having pixels which are exposed to an image of a target;
   an illumination generator for illuminating the image with light, the illumination generator being configured to have a front face;
   an aiming pattern generator for producing a visible aiming pattern on the target; a housing for housing the sensor array, aiming pattern generator and illumination generator for hand held operation, the housing having a window disposed between the illumination generator and the image for permitting transmission of the illuminating light;
   a lens assembly comprising a lens for focusing light to the sensor array, wherein the lens assembly protrudes through the illumination generator; and
   a gasket disposed around at least part of the lens on the front face of the illumination generator, wherein the gasket is positioned to reduce the amount of light transmission from the illumination generator to the area around the lens.

8. An optical reading device in accordance with claim 7, wherein the illumination generator is comprised of LEDs disposed behind a light pipe.

9. An optical reading device in accordance with claim 7, wherein the illumination generator comprises a flat face.

10. An optical reading device in accordance with claim 7, wherein the illumination generator comprises a flat semi-transparent face.

11. An optical reading device in accordance with claim 7, wherein the gasket is comprised of a thermoplastic elastomer.

12. An optical reading device in accordance with claim 7, wherein the gasket is flanged.

13. An optical reading device comprising:
   an imaging assembly including an illumination generator for illuminating an image with light, the illumination generator being configured to have a front face, and a lens for focusing light from a target to a sensor array;
   a housing for housing the imaging assembly, the housing configured for hand held operation and having a window disposed between the illumination generator and the image for permitting transmission of the illuminating light;
   a gasket disposed around at least part of the lens on the front face of the illumination generator, wherein the gasket is positioned to absorb illuminating light reflected off of the window traveling back towards the lens.

14. An optical reading device in accordance with claim 13, wherein the illumination generator is comprised of LEDs disposed behind a light pipe.

15. An optical reading device in accordance with claim 13, wherein the illumination generator comprises a flat face.

16. An optical reading device in accordance with claim 13, wherein the illumination generator comprises a flat semi-transparent face.

17. An optical reading device in accordance with claim 13, wherein the gasket is comprised of a thermoplastic elastomer.

18. An optical reading device in accordance with claim 13, wherein the gasket is flanged.

19. An optical reading device in accordance with claim 13 further including an aiming pattern generator for producing a visible aiming pattern on the target.

* * * * *